UNITED STATES PATENT OFFICE.

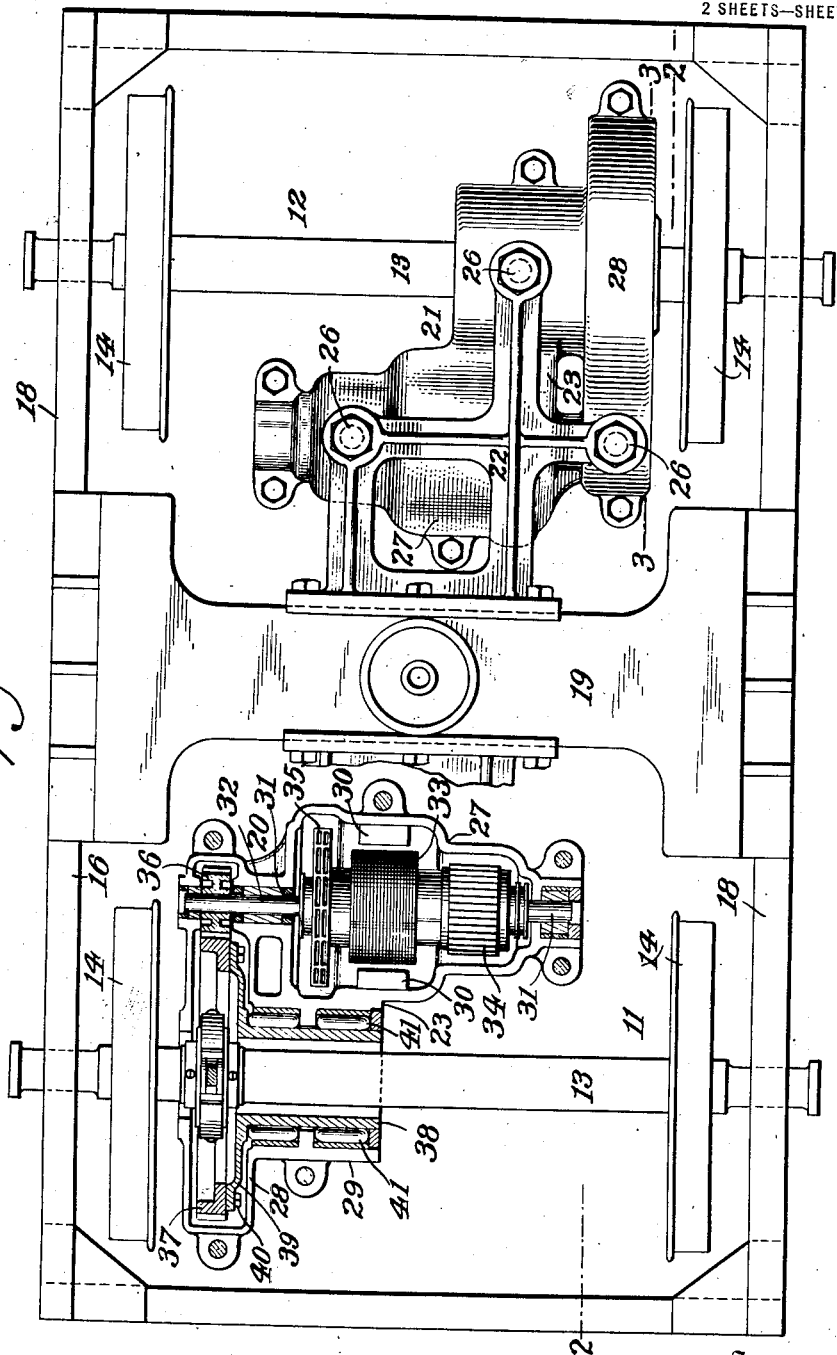

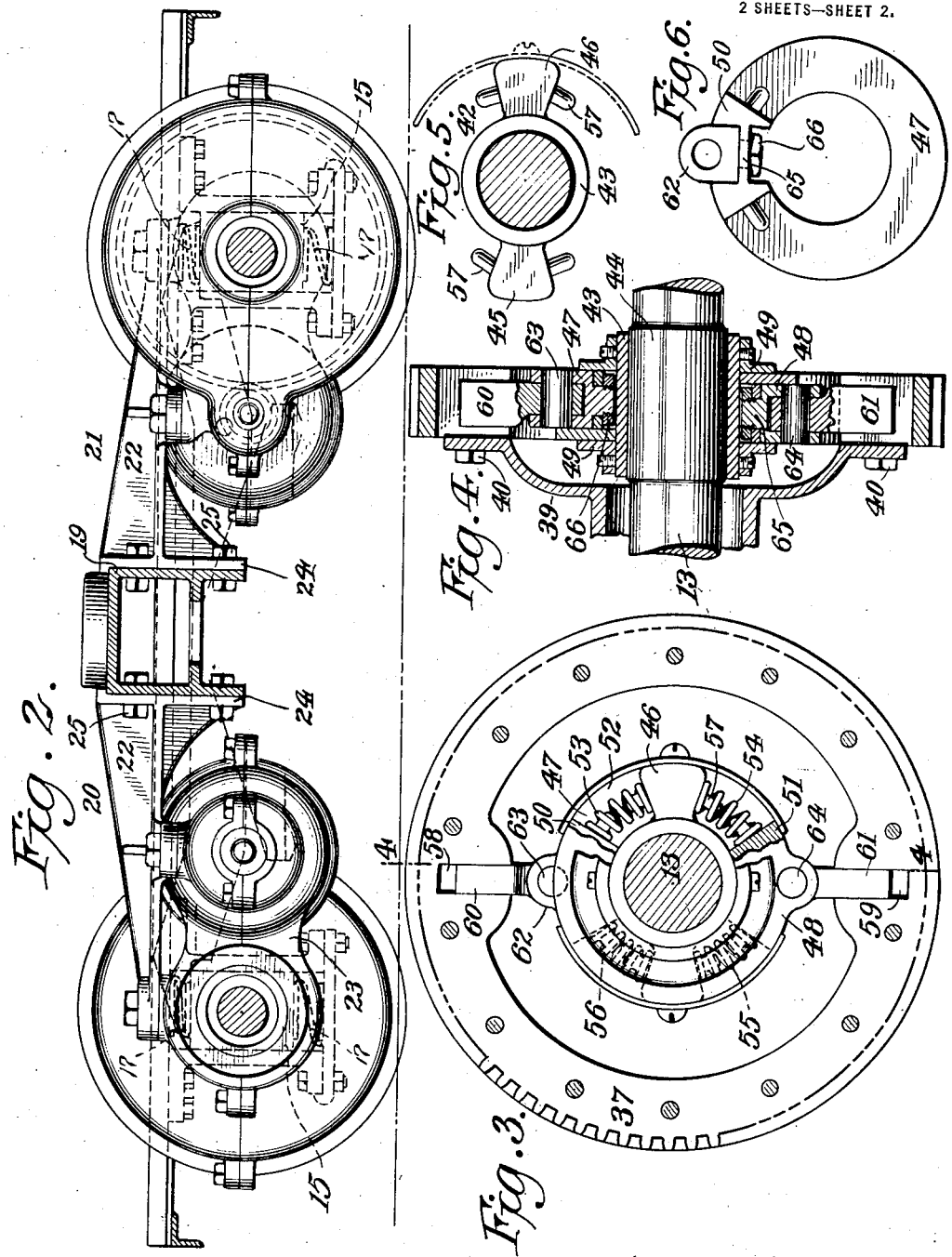

HOWARD J. MURRAY, OF BROOKLYN, NEW YORK, AND WALTER S. RUGG, OF PITTSBURGH, PENNSYLVANIA.

RESILIENTLY-MOUNTED TRANSMISSION.

1,386,589.  Specification of Letters Patent.  Patented Aug. 2, 1921.

Application filed May 27, 1918. Serial No. 236,856.

*To all whom it may concern:*

Be it known that we, HOWARD J. MURRAY, a citizen of the United States, and a resident of Brooklyn, county of Kings, and State of New York, and WALTER S. RUGG, a citizen of the United States, and a resident of Pittsburgh, county of Allegheny, and State of Pennsylvania, have invented certain new and useful Improvements in Resiliently-Mounted Transmission, of which the following is a specification.

The invention relates in general to a power system for driving an axle from a spring supported motor and in its broad aspects constitutes another embodiment of the invention defined in our copending application entitled Motor casing truck construction Serial No. 236,854, filed under even date.

In the co-pending application it was suggested to mount two motors on a spring supported bolster element of a two axle motor truck, and drive the axle from a pair of electric motors carried by the bolster and each motor connected to its adjacent axle by a flexible connection designed to permit relative movement between the motor and the axle driven thereby. It was further proposed to inclose the driving connection in a casing supported for free rotary movement about the driven axle.

The invention herein disclosed relates specifically to the flexible driving connection between the armature shaft of the resiliently supported motor and the axle driven thereby and differs from the other application, first, in the character of support for the transmission containing casing and second in the character of the flexible drive mounted within the casing.

One of the general objects of the invention is to provide a simple form of axle drive which will permit freedom of relative movement between the driven axle and the motor which is itself cushioned against shocks on the axle, and which will be otherwise independent thereof, except for its flexible driving engagement with the axle.

Specifically the invention contemplates a mounting for the motor and transmission which mounting will maintain the elements thereof in preset relative relation not affected by the wanderings of the axle from its normal position and at the same time will act as a casing to inclose the entire power plant.

Another specific feature of the invention is to provide a simple form of flexible element in the transmission which element will include a spring drive substantially free of all strains thereon except those incidental to the driving function of the transmission.

Various other objects and advantages of the invention will be in part obvious from an inspection of the accompanying drawings and in part will be more fully set forth in the following particular description of one form of mechanism embodying our invention, and the invention also consists in certain new and novel features of construction and combination of parts hereinafter set forth and claimed.

In the accompanying drawings:—

Figure 1 is a plan view of the top portion of a motor truck with parts broken away and showing a preferred embodiment of our invention attached thereto;

Fig. 2 is a longitudinal sectional view taken on the line 2—2 of Fig. 1 and Figs. 3–6, inclusive, are detailed sectional views of the flexible transmission connected to one of the drive axles; Fig. 3 being a transverse sectional view taken on the line 3—3 of Fig. 1; Fig. 4 being a transverse sectional view taken on the line 4—4 of Fig. 3; and Figs. 5 and 6 being views in side elevation respectively of the driven wing member and one of the traveling rings shown in Figs. 3 and 4.

In the following description and in the claims, parts will be identified by specific names for convenience of expression but they are intended to be as generic in their application to similar parts as the art will permit.

In the drawings there is shown a pair of running gears 11 and 12 each including an axle 13 to which are fixed flanged wheels 14. The running gears are revolubly mounted in journal boxes 15 shown in dotted lines in Fig. 2. These boxes constitute a support for a truck frame 16 resiliently supported from the axles by means of springs 17 positioned between the boxes and the side sills 18 of the truck frame as is usual with such constructions. The truck frame includes a centrally positioned transverse member 19 in the form of a one piece casting, the upper portion of which constitutes a bolster and which also constitutes the king pin casting for pivotally connecting the truck with the car body (not shown).

The upper portion of this bolster when viewed in plan resembles the conventional bolster and in other respects the parts thus described are intended to represent conventional constructions.

However, this transverse member differs from the conventional bolster in several respects. It is double walled, is of materially greater depth, as shown in Fig. 2, than the conventional form and extends both above and below the side sills 18.

A pair of attachments 20 and 21 particularly constituting the subject-matter of this invention are mounted on opposite sides of the transverse member 19 and are operatively connected to drive the running gears 11 and 12 independently of each other while permitting relative movement between the bolster and each axle as has been more fully described in our above identified copending application. As these attachments are similar to each other, except for obvious changes in direction from the bolster the detailed description of either one will be sufficient for the other.

The attachment includes a relatively heavy work casting 22 constituting a bracket for supporting the motor and transmission containing casing 23 from one side of the member 19. The bracket includes a relatively deep supporting facing flange 24 affixed to the outside of the transverse member 19 by means of bolts 25. The casting is webbed as shown in Figs. 1 and 2 and is provided with a three-point suspension 26 for demountably supporting the casing 23 hung therefrom. The casing may be removed as a unit from the casting 22 by loosening the suspension 26 without demounting the casting from the transverse truck member 19.

Viewing the casing 23 in elevation it may be considered as a two-part shell designed to be separated horizontally along the line of the axis of the motor hereinafter described and along the axis of the axle 13 and so arranged that it may be positioned to encircle the axle without demounting the axle from its truck. Viewed in plan the casing may be regarded as made up of two parts rigidly fastened together and opening one into the other. The part of the casing positioned adjacent the transverse member 19 constitutes a motor casing 27 from one end of which extends the transmission containing casing 28. The casing 28 is provided with a bearing sleeve 29 inclosing a portion of the adjacent axle 13 rigidly connected with one side of the motor casing 27 and preferably integral therewith.

The motor casing is provided with an oppositely disposed pair of field pieces 30 and is provided at opposite ends with bearings for the armature shaft 32. The shaft is provided with an armature 33, commutator 34, and ventilating fan 35, all as is usual with conventional devices of this character. The armature shaft drives a reducing gear train which includes a small pinion 36 fixed to the armature shaft and constantly meshing with the relatively large slow speed gear 37 which encircles the axle 13. The teeth of the gear and pinion are of the herring-bone type and are so set relative to each other so as to obtain the most effective driving organization. The casing 23 coacts with the motor casing to maintain the axis of the armature shaft, the pinion 36 and the gear 37 in fixed preset relation and independent of relative movement between the same and the axle 13. The gear 37 is supported with its axis fixed in the casing 38 by means of long bearing engagement. This engagement includes a hub-portion in the form of a sleeve 38 which surrounds the axle 13 but has an internal diameter greater than the diameter of the axle so as to provide a clearance sufficient to permit all possible relative movement between the sleeve and axle in the shifting of the axle relative to the spring support casing. One end of the sleeved hub portion 38 is provided with an outstanding dish shaped flange 39 affixed to the side of the gear 37 by means of bolts 40. The gear 37 together with its hub portion is supported in the extension 29 of the casing 28 through long roller bearing 41. A flexible driving connection (see Figs. 3 and 4) is positioned within the plane of the gear 37 and is operatively connected thereto and to the axle to drive the same in all possible shifted positions of the axle relative to the gear. By this construction it is possible to mount the transmission within the casing and to support practically the entire transmission from the casing. As but little of the weight of the transmission is carried by the axle this member is relieved of any heavy weight imposed thereon with the resulting diminution of pounding effect on the tracks.

The flexible connection includes a driven wing member 42 (Fig. 5) provided with a sleeve 43 shrunk on to an enlarged portion 44 of the axle. This member is provided with a pair of fish-tail shaped driving arms 45 and 46 extending diametrically therefrom in the plane of the gear 37. A pair of traveling rings 47 and 48 are loosely mounted upon the sleeve 43 and held centered thereon and in abutting position by means of a pair of flanged end collars 49 fixed to the sleeve 43 at opposite ends thereof. Each of the rings 47 and 48 are provided respectively with a laterally projecting raised portion 50 and 51 designed normally to extend diametrically opposite each other and on opposite sides of the axle 13. One of the raised portions 50 is positioned between the driving arms 45 and 46 on one side of the axle and the other raised portion 51 is similarly positioned between the arms 45 and 46 on the opposite side of the axle 13. The construction provides four spring containing spaces 52 between the succeeding arms and raised portions. These constitutes bearing members for engaging opposite ends of four springs numbered clockwise in Fig. 3, as 53, 54, 55 and 56. The driving arms 45 and 56 and the raised portions 50 and 51 are provided with spring guiding pins 57 designed to be positioned in opposite ends of the spring so as to guide the same in the rotary movement of the traveling rings about the axle. By this construction it is seen that any pressure on either ring tending to turn the same about the axle will act through the spring drive to rotate the axle.

The gear wheel 37 is provided with a pair of inwardly facing and diametrically disposed guiding slots 58 and 59, the slot 58 containing a guiding arm 60 slidably mounted therein and the slot 59 being similarly provided with an arm 61 and both confined on their reciprocatory movement to a plane passing through the axis of the gear 37. The arm 60 is let into the bifurcated outer edge of an ear 62 forming an extension from the raised portion 50 and is pivoted thereto by means of a pin 63. The arm 61 is similarly pivoted to the raised portion of the ring 48 by means of a pivoting pin 64.

Preferably the arms 60 and 61 are mounted for rotary movement relative to the rings 47 and 48. For this purpose a shaft 65 projects inwardly from each of the ears 62, is passed through a socket opening formed in the raised portions 50 and is fastened in position by means of a nut 66.

In operation it will be understood that the armature shaft driven by the motor at high speed transmits its rotary movement through a simple type of reducing gear train and flexible connection to the driven axle. During this movement the axis of the driven gear will describe a small circle about the axis of the axle, which movement is possible due to the clearance provided by the hub sleeve 38. The axis of the axle is free to move in any one of three planes at right angles to each other, or, in other words, the axle is free to move in any direction relative to the motor and transmission containing casing. As the casing is spring supported on the truck, it is free to move with the spring supported bolster element without in any way affecting the positive driving of the axle by the contained motor. The axis of the axle and the axis of the driven gear 37 are designed to coincide only under normal conditions of rest, as shown in Fig. 3, and are intended to move relatively to each other in the active operation of the device. The arms 60 and 61 not only move in and out of their guiding slots 58 and 59 but they may also move transversely of the plane of the gear with a twisting action. These arms of course never leave the diameter of the circle representing the gear and considering merely the rotary movement of the gear it is noted that in a complete cycle of movement of the arms, for instance arm 60, occupies the same position in its slot 58 that was previously occupied by the other arm 61 in its slot 59 when in the corresponding position. Therefore, when the center of the gear shifts away from the center of the axle, while the arms are held in the diameter of the gear, the traveling rings must give and move about the axle and through an angle depending upon the amount of displacement between the axes of the gear and shaft relative to each other.

For a detailed explanation of the driving condition at some one point in its cycle of movement, let it be assumed that the gear 37 has been moved to the right in Fig. 3. In this case the diameter of the gear will lie to the right of the center of the axis but the arms 60 and 61 are held for movement in a straight line passing through the axis of the gear. This will slightly rotate the traveling ring about the axis of the axle and cause the rings to turn on their pivoting pins 63 and 64. In this illustration the traveling ring 47 has moved clockwise about the collar 43 and the ring 48 has been moved counter-clockwise. Moving the traveling ring 47 clockwise compresses the spring 53 to the right of it in Fig. 3, thus tending to move the driving arm 46 counter-clockwise and compressing the spring 54 against the ring 48 carrying the arm 61. It will thus mean that both springs 53 and 54 are under compression and bearing against the arm 46. The tension at this time is removed from the oppositely disposed springs 55 and 56 engaging the opposite driving arm 45. As the gear 37 is revolving at this time power is transmitted therefrom through the compressed spring 53 onto the driving arm 46 and therefrom directly through the collar 43 to the axle to turn the same. With the gear displaced and under motion, each of the springs will be compressed once against the arm 46 and once against the arm 45 in each revolution of the gear 37. Considering any given point on the arms 60 and 61 the movement of any such point in one complete revolution will conform to the sine law, the amplitude of its wave being determined by the displacement of the axis of the gear 37 and axle 13. By this construction it is possible for the axis of the axle to move radially of the gear 37 while it is being driven by the same.

Considering the situation in which the axis of the gear neither coincides with the axis of the axle nor is parallel thereto, it will be noted that this distortion has minimum effect on the efficiency of the drive. In this case the axis of the gear is not only offset but is making an angle with the axle. The arms 60 and 61 in this case not only move radially of their guiding slots but may also move transversely of the plane of the gear and about a radius of their own. While this transverse movement, in the normal action of the axle is but slight, even this slight action is taken care of in this construction and in the tendency of the axle and casing to restore themselves to normal position will cause the arms 60 and 61 to be restored to their normal position centered in their guiding slots.

By means of a device of this character it is possible to maintain a preset meshed gear driving connection in gear train and the flexible transmission provides for all necessary variation in the position of the axle relative to the casing while maintaining a positive drive between the last member of the gear train and the axle in all positions of the same. The axle is strictly a floating axle for it is free to move practically without restraint from the connection of the flexible driving element fixed thereto.

In this disclosure it is noted that the driving springs 53—58 do not have to support the weight of the motor or any other part except the light ring members which hold the springs 53—58. As these springs have only a compression and a slight centrifugal force to withstand they can be made much lighter than the springs usually used in a spring drive of this character. These springs are preferably placed under some slight initial compression so that the tension will be partially removed when they are allowed to expand during each revolution of the driving gear. As each spring is placed under tension and then released at each revolution of the gear it is released of any constant bearing tension and its resiliency is thus maintained. Due to the relatively slow speed of the gear 37 heating conditions which might injuriously effect the springs at high speed, can be ignored.

As the motor, pinion, gear, and gear casing are spring suspended, the jarring incidental to the use of motor driven trucks heretofore in active service has been eliminated, thus permitting the installation of ball bearings, high grade steel castings and other expensive elements which go to make up the efficiency of high speed, light electric motors and their drives and the use of which have not heretofore been possible in connection with heavy motor car structure of the flange wheel type.

Having thus described our invention, we claim:

1. In a device of the class described, the combination of a spring supported motor and transmission containing casing, a motor mounted in said casing, a reducing gear train mounted in said casing and operatively connected to the motor to be driven thereby, a floating axle provided with supporting wheels, and a universally flexible driving connection between the last element of the gear train and said axle whereby free relative movement is permitted between the axle and casing in a direction longitudinally of the axle.

2. In a device of the class described, the combination of a transmission containing casing, means for resiliently mounting said casing, a gear train mounted in said casing, a freely movable floating axle in spaced relation to the casing provided with supporting wheels and a flexible driving connection between said axle and gear train.

3. In a device of the class described, the combination of a truck frame, a transmission containing casing rigidly affixed thereto, means for resiliently mounting said truck frame, a gear train mounted in said casing, a floating axle provided with supporting wheels, a flexible driving connection between said axle and gear train permitting relative movement between the axle and truck frame and a power member operatively connected to said resiliently mounted gear train to drive the axle.

4. In a device of the class described, the combination of a transmission containing casing, means for resiliently mounting said casing, a gear train mounted in said casing, a floating axle provided with supporting wheels extending through but physically disconnected from the casing whereby the axle is free to move unrestrained by the casing, a flexible driving connection between said axle and gear train, a power member operatively connected to said resiliently mounted gear train to drive the axle and means for connecting the power member and gear train whereby they will move in unison.

5. In a device of the class described, the combination with a power member, and an axle provided with supporting wheels and also provided with a power receiving member fixed thereto, of a flexible driving connection between said power receiving member and said axle, and resilient means for supporting said driving connection being spaced from the axle so as to be supported independently of the same whereby the axle is free to move relative to the cushioned driving connection.

6. In a device of the class described, the combination of a gear train, a mounting for the same adapted to maintain the axis of the different gears of the train fixed relative to each other, resiliently supported means for cushioning the movement of said mounting, a running gear including an axle passed through the last gear of the train and movable relative thereto and a flexible driving connection between said last gear and said running gear and disposed substantially in the plane of said last gear.

7. In a device of the class described, the combination of a running gear including an axle, a driving gear for driving the running gear provided with a hub surrounding the axle and spaced therefrom to permit relative movement between the axle and driving gear, a pinion meshing with said driving gear, means supported from the hub for maintaining the pinion in meshing engagement with the gear, means for supporting said hub and a flexible driving connection between the driving gear and the running gear, said driving connection being free of the weight of the driving gear.

8. In a device of the class described, the combination of a running gear including an axle, a gear train for driving the running gear, resilient means for supporting the driving gear from the running gear, said gear train including a driving gear provided with a hub spaced from the axle and movable relative thereto, and gear train supporting means engaging said hub for supporting the pinion in fixed meshing engagement with the gear and a flexible driving connection between the driving gear and the running gear.

9. In a device of the class described, the combination of a running gear including an axle, a gear train for driving the running gear, said gear train including a driving gear provided with a hub spaced from the axle and movable relative thereto, and gear train supporting means engaging said hub for supporting the pinion in fixed meshing engagement with the gear, cushioning means for supporting the gear train supporting means and a flexible driving connection substantially uninfluenced by the weight of the driving gear and disposed between the driving gear and the running gear.

10. In a device of the class described, the combination of a running gear including an axle, a power plant for driving said running gear, said plant including a motor and a gear train driven thereby, a support in spaced relation to the axle for maintaining said motor and gear train in prefixed driving relation, resilient means for supporting said support independently of the axle, and a flexible driving connection between said gear train and said running gear.

11. In a device of the class described, the combination of a driven axle, a power member encircling the axle and free to move in any direction relative thereto, a floating bearing for said power means, means for resiliently supporting the bearing, a driving connection between said member and axle, said connection including a plurality of springs constituting the sole connection between the power member and the axle, said springs disposed between the axle and member and acting on said axle and power member to maintain the axis thereof in normal relative position and thus tend to resist relative longitudinal movement of the axle and power member.

12. In a device of the class described, the combination of a driven shaft, a rotary driving member encircling the shaft, and resiliently supported therefrom, a flexible driving connection between said member and shaft, said connection providing for a freedom of relative movement in any one of three planes at right angles to each other between a point in the axis of the shaft and the center of rotation of said driving member, the direction of said three movements being at right angles to each other.

This specification signed this 20th day of May, 1918.

HOWARD J. MURRAY.
WALTER S. RUGG.